United States Patent [19]

Terada et al.

[11] Patent Number: 5,759,373
[45] Date of Patent: Jun. 2, 1998

[54] POROUS ION EXCHANGER AND METHOD FOR PRODUCING DEIONIZED WATER

[75] Inventors: Ichiro Terada; Iku Saito; Haruhisa Miyake; Ken Komatsu; Kazuo Umemura; Junjiro Iwamoto, all of Yokoyama, Japan

[73] Assignee: Asahi Glass Company Ltd., Tokyo, Japan

[21] Appl. No.: 704,680

[22] PCT Filed: Jan. 18, 1996

[86] PCT No.: PCT/JP96/00068

§ 371 Date: Sep. 19, 1996

§ 102(e) Date: Sep. 19, 1996

[87] PCT Pub. No.: WO96/22162

PCT Pub. Date: Jul. 25, 1996

[30] Foreign Application Priority Data

Jan. 19, 1995 [JP] Japan .......................... 7-6720

[51] Int. Cl.⁶ .................. B01J 47/00; B01J 49/00; B01D 61/48

[52] U.S. Cl. .................. 204/524; 204/533; 204/536; 204/632; 521/25; 521/26; 521/27; 521/28

[58] Field of Search ................... 204/524, 533, 204/536, 632; 521/25, 26, 27, 28

[56] References Cited

U.S. PATENT DOCUMENTS

| | | | |
|---|---|---|---|
| 3,869,376 | 3/1975 | Tejeda | 204/632 |
| 3,984,358 | 10/1976 | Nefedova et al. | 260/2.1 R |
| 4,719,241 | 1/1988 | Yates | 521/28 |
| 4,719,242 | 1/1988 | Yates | 521/28 |
| 5,128,378 | 7/1992 | Sugaya et al. | 521/33 |
| 5,180,750 | 1/1993 | Sugaya et al. | 521/32 |
| 5,248,401 | 9/1993 | Bridger et al. | 204/290 R |

*Primary Examiner*—Arun S. Phasge
*Attorney, Agent, or Firm*—Oblon, Spivak, McClelland, Maier & Neustadt, P.C.

[57] ABSTRACT

A porous ion exchanger which has a porous structure having ion exchange resin particles bound by a binder polymer, and which has a water permeability of at least 30 kg·cm$^{-1}$·hr$^{-1}$ under a pressure of 0.35 kg/cm$^2$.

13 Claims, No Drawings

5,759,373

POROUS ION EXCHANGER AND METHOD FOR PRODUCING DEIONIZED WATER

This application is a 371 continuation filed Jan. 18, 1996.

TECHNICAL FIELD

The present invention relates to a liquid permeable porous ion exchanger. Particularly, it relates to a porous ion exchanger useful for producing deionized water by electrodialysis.

BACKGROUND ART

As a method for producing deionized water, a method is common wherein water to be treated is supplied to a bed packed with an ion exchange resin to have impurity ions adsorbed and removed on the ion exchange resin to obtain deionized water. Here, a method is adopted wherein ion exchange resins having the adsorbing ability lowered, is regenerated by means of an acid or alkali. However, in this method, waste water containing the acid or alkali used for the regeneration is problematic. Therefore, it is desired to develop a method for producing deionized water, which requires no regeneration.

From such a viewpoint, an attention has been drawn in recent years to a self-regenerating type electrodialytic method for producing deionized water employing a combination of an ion exchange resin and an ion exchange membrane. This method is a method for producing deionized water, wherein a mixture of an anion exchanger and a cation exchanger is accommodated in a demineralizing compartment of an electrodialyzer having an anion exchange membrane and a cation exchange membrane alternately arranged, and while supplying water to be treated to this demineralizing compartment, a voltage is applied to conduct electrodialysis.

With respect to this method, there have been proposed a method of specifying the width and the thickness of the demineralizing compartment (U.S. Pat. No. 4,632,745), a method of using an ion exchange resin having a uniform diameter as the resin to be packed in the demineralizing compartment (U.S. Pat. No. 5,154,809), a method of using an anion exchange resin as the ion exchange resin to be packed at the portion where water to be treated is first passed (Japanese Unexamined Patent Publication No. 71624/1992) and a method of using a mixture of an ion exchange resin and an ion exchange fiber as the ion exchanger to be packed in a demineralizing compartment (Japanese Unexamined Patent Publication No. 277344/1993).

However, these method had drawbacks such that the crosslinked ion exchange resin as the ion exchange resin used in the demineralizing compartment was not fixed, whereby the ion exchanger with the same electric charge tended to flocculate during the use, the ion exchange resin particles or fibers were likely to be broken by water current, and no effective demineralization and regeneration tended to be conducted, and there was a problem in the stability in the purity of obtained water. As a method for mending such drawbacks, there has been proposed a method of introducing ion exchange groups to a nonwoven fabric of e.g. polyethylene or polypropylene by radiation grafting (Japanese Unexamined Patent Publications No. 64726/1993 and No. 131120/1993), or a method wherein an ion exchange polymer and a reinforcing polymer are formed into a composite fiber having a matrix structure, which is then formed into a sheet (Japanese Unexamined Patent Publication No. 79268/1994).

In these methods, the ion exchangers are fixed, but there have been drawbacks that it is necessary to use radiation, the process for producing a composite fiber is complex, and the mechanical strength is not necessarily adequate.

DISCLOSURE OF INVENTION

It is an object of the present invention to provide a self-regenerating type electrodialytic method for producing deionized water using a combination of an ion exchanger and an ion exchange membrane, whereby a fixed ion exchanger is prepared without requiring a complex process such as use of radiation, and highly pure deionized water is produced constantly.

The present invention provides a porous ion exchanger which has a porous structure having ion exchange resin particles bound by a binder polymer, and which has a water permeability of at least 30 kg·cm$^{-1}$·hr$^{-1}$ under a pressure of 0.35 kg/cm$^2$.

The water permeability is determined in such a manner that a sample of columnar shape (e.g. a prismatic or cylindrical shape) having mutually parallel two end surfaces, then water is introduced from one end surface under a pressure of 0.35 kg/cm$^2$ while water-tightly sealing the side surface, and the weight of water flowing out from the other end surface is measured. Here, the water permeability is represented by WL/A (kg·cm$^{-1}$·hr$^{-1}$), where A is the area (cm$^2$) of the end surface, L is the height (cm) of the columnar sample (i.e. the distance between the end surfaces), and W is the amount of water permeated per hour (kg/hr). A and L may be set optionally. However, the measurement is preferably carried out with A being from about 1 to 1000 cm$^2$, and L being from about 1 to 100 cm.

The water permeability of the porous ion exchanger is preferably at least 30 kg·cm$^{-1}$·hr$^{-1}$ under a pressure of 0.35 kg/cm$^2$. If it is less than 30 kg·cm$^{-1}$·hr$^{-1}$, when the porous ion exchanger of the present invention is disposed in the flow pathway, the pathway resistance tends to be substantial, whereby the amount of water treated will decrease, or the operation will have to be conducted under a high pressure, such being undesirable. More preferably, the water permeability is at least 100 kg·cm$^{-1}$·hr$^{-1}$. The higher the water permeability, the better. However, in order to prepare the one having high water permeability, it is necessary to prepare a material having correspondingly large pores, whereby the ion exchange capacity or the mechanical strength is likely to deteriorate. Therefore, the upper limit is practically at a level of 10000 kg·cm$^{-1}$·hr$^{-1}$.

When the porous ion exchanger has anisotropy, the water permeability is measured in a direction corresponding to the water flow in a state where the ion exchanger is placed in the flow pathway. In the case of a material which is swelling in water, the water permeability is measured in an environment in which it is practically used. Likewise, the temperature for the measurement is adjusted to the same level as in the practical operation.

The present invention also provides a method for producing a liquid permeable ion exchanger, which comprises mixing a mixture of cation exchange resin particles and anion exchange resin particles with a binder polymer or a binder polymer solution, followed by thermoforming or solvent-removal to obtain a porous ion exchanger.

The present invention further provides a method for producing deionized water, which comprises conducting an electric current while supplying water to be treated to a demineralizing compartment of a deionized water producing apparatus having an ion exchanger accommodated in the demineralizing compartment of an electrodialyzer having a cation exchange membrane and an anion exchange membrane alternately arranged between a cathode and an anode, wherein the above-mentioned ion exchanger is used as the ion exchanger.

The material for the ion exchange resin particles is not particularly limited, and various ion exchange resins may be used. Specifically, preferred is the one having ion exchange groups introduced to a styrene/divinylbezene copolymer. As the ion exchange groups, cation exchange groups are preferably of a sulfonic acid type as a strong acid, and anion exchange groups are preferably of a quaternary ammonium salt type or a pyridinium salt type as a strong base, in view of the ion exchange ability and the chemical stability.

The ion exchange capacity of the ion exchange resin particles is preferably from 0.5 to 7 meq/g·dry resin. If the ion exchange capacity is less than 0.5 meq/g·dry resin, the ion exchange performance tends to be inadequate, and when such a porous ion exchanger is disposed in a demineralizing compartment of an electrodialyzer, adsorption of ions and demineralization tend to be inadequate, and the purity of treated water tends to be low, such being undesirable. If the ion exchange capacity exceeds 7 meq/g·dry resin, the stability of the ion exchange resin itself tends to be impaired. The ion exchange capacity is more preferably from 1 to 5 meq/g·dry resin, whereby a high ion exchange ability can be obtained, and the stability in performance will be excellent.

The particle size of the ion exchange resin particles is preferably within a range of from 50 to 1000 μm. If the particle size is smaller than 50 μm, the diameters of pores of the resulting porous ion exchanger tend to be small, whereby the water permeability tends to be low, such being undesirable. If the particle size exceeds 1000 μm, the surface area of the ion exchanger tends to be inadequate, whereby the ion exchange treating efficiency tends to be low, such being undesirable. The particle size of the ion exchange resin particles is more preferably from 300 to 600 μm. The ion exchange resin may be synthesized so that the particle size will be within the above range, or an ion exchange resin may be pulverized so that the particle size will be within the above range.

The shape of the ion exchange resin particles is not particularly limited, and spherical particles are preferred, since excellent water permeability can thereby be attained.

With respect to the porosity of the porous ion exchanger, the porosity of pores open to the exterior, which are influential over the passage of the liquid, is preferably from 5 to 50 vol %. If the porosity is less than 5 vol %, the flow rate of the liquid decreases, and the pressure loss increases, such being undesirable. If the porosity exceeds 50 vol %, the mechanical strength of the porous ion exchanger tends to be low, whereby the handling tends to be difficult. The porosity is more preferably from 10 to 40 vol %, whereby the water permeability will be excellent, the demineralization performance will be excellent, and treated water of a high purity can be obtained. With respect to this porosity, pores which will not be in contact with the liquid when the porous ion exchanger is disposed in the flow pathway of the liquid, are not regarded as the pores open to the exterior.

In the porous ion exchanger of the present invention, the ion exchange resin particles are bound by the binder polymer, whereby the contact of the ion exchange resin particles to one another may be improved on one hand, and the contact may be impaired by the presence of the binder polymer among the ion exchange resin particles, on the other hand. For the purpose of disposing it in a demineralizing compartment of an electrodialyzer, the porous ion exchanger preferably has a low electrical resistance.

The resistivity when the porous ion exchanger is disposed in a demineralizing compartment of an electrodialyzer, is preferably at most twice the resistivity measured under such a condition that the ion exchange resin particles contained in the porous ion exchanger are packed in the same demineralizing compartment without the binder. If the resistivity is higher than twice, the working voltage for operation has to be high, and the running cost will be high. The resistivity measured in such a manner is more preferably lower than the resistivity measured with respect to the resin particles.

The porous ion exchanger may be composed of cation exchange resin particles only, anion exchange resin particles only or a mixture of cation exchange resin particles and anion exchange resin particles. In a case where cation exchange resin particles and anion exchange resin particles are used in combination, they may be uniformly mixed, or they may have a phase separated structure like a matrix structure or a layered structure comprising portions composed solely of cation exchange resin particles and portions composed solely of anion exchange resin particles.

When the ion exchanger is used as disposed in a demineralizing compartment of an electrodialyzer, it is preferably the one containing both cation exchange resin particles and anion exchange resin particles, and the ratio of the cation exchange resin particles to the anion exchange resin particles used in the entire demineralizing compartment is preferably cation exchange resin/anion exchange resin=30/70 to 60/40 by the total ion exchange capacity ratio. If the total ion exchange capacity ratio is outside this range, the purity of treated water tends to be low, such being undesirable.

The weight ratio of the binder polymer is preferably from 0.5 to 20%, based on the weight of the porous ion exchanger. If the weight ratio is less than 0.5%, the mechanical strength of the porous ion exchanger tends to be low, and the handling tends to be difficult. If the weight ratio is larger than 20%, the binder polymer tends to cover the surface of the ion exchange resin particles, whereby the adsorbing property tends to be low, and the porosity tends to be low, whereby the water permeability will be low, such being undesirable. More preferably, the weight ratio of the binder polymer is from 1 to 5%.

The binder polymer is preferably a thermoplastic polymer or a polymer soluble in a solvent, from the viewpoint of the process for producing the porous ion exchanger. Further, a polymer having ion exchange groups is preferred, since it is thereby possible to increase the ion exchange performance.

The ion exchange capacity of the binder polymer having ion exchange groups is preferably from 0.5 to 5 meq/g·dry resin. If the ion exchange capacity is less than 0.5 meq/g·dry resin, the ion exchange performance tends to be inadequate, and when the porous ion exchanger is disposed in a demineralizing compartment of an electrodialyzer, adsorption of ions and demineralization tends to be inadequate, and the purity of treated water tends to be low, such being undesirable. If the ion exchange capacity exceeds 5 meq/g·dry resin, the stability of the ion exchange resin itself tends to be impaired. More preferably, the ion exchange capacity is from 0.8 to 3 meq/g·dry resin, whereby an ion exchanger having a high ion exchange ability can be obtained, and the stability of performance will also be excellent.

The following polymers may preferably be employed as the binder polymer. Firstly, as a thermoplastic polymer, low density polyethylene, linear low density polyethylene, high molecular weight high density polyethylene, polypropylene, polyisobutylene, vinyl acetate, or an ethylene/vinyl acetate copolymer may, for example, be mentioned. As a solvent-soluble polymer, natural rubber, butyl rubber, polyisoprene, polychloroprene, a styrene/butadiene rubber, nitrile rubber, polyvinyl alcohol or a vinyl chloride/fatty acid vinyl ester copolymer may, for example, be mentioned.

Further, as a polymer having ion exchange groups, a polymer containing polystyrene sulfonic acid, polyvinylsulfonic acid, poly(2-acrylamide-2methylpropanesulfonic acid), polyacrylic acid, polymethacrylic acid or perfluorosulfonic acid, or a polymer containing a salt thereof, may, for example, be mentioned. Further, a polymer containing polyvinylbenzyltrimethylammonium chloride may also be mentioned. Furthermore, a polymer containing poly(4vinylpyridine), poly(2-vinylpyridine), poly(dimethylaminoethylacrylate), poly(1-vinylimidazole), poly(2-vinylpyrazine), poly(4-butenylpyridine), poly(N,N-dimethylacrylamide) or poly(N,N-dimethylaminopropylacrylamide), or a polymer containing a quaternary derivative thereof, may be mentioned. Further, a polymer containing polyethyleneimine may be mentioned.

Among such polymers, when a water-soluble polymer is used, it is preferred to add a crosslinking agent to the binder polymer solution to carry out crosslinking treatment before use.

As a method for producing the porous ion exchanger of the present invention, the following methods are preferred. That is, a method wherein the ion exchange resin particles and the binder polymer are heat-kneaded and then formed into a sheet by thermoforming by e.g. flat plate press, a method wherein a binder polymer solution is coated on the surface of the ion exchange resin particles, and the solvent is evaporated for curing, a method wherein the binder polymer, a pore-forming agent and the ion exchange resin particles are heat-mixed and molded, whereupon the pore-forming agent is extracted, and a method wherein a binder polymer solution having a pore-forming agent dispersed, is coated on the surface of the ion exchange resin particles and cured, whereupon the pore-forming agent is extracted.

Among such methods, a method wherein the ion exchange resin particles and the binder polymer are heat-kneaded, followed by thermoforming by e.g. flat plate press, or the method wherein the binder polymer, the pore-forming agent and the ion exchange resin particles are heat-mixed and molded and then the pore-forming agent is extracted, is preferred from the viewpoint of the forming processability, the resistivity of the obtained porous ion exchanger, etc. In such a case, the binder polymer is preferably mixed in the form of particles having a particle size equal to or smaller than the ion exchange resin particles. The thermoforming temperature for the above binder polymer is not particularly limited, and it is preferably from 120° to 180° C. from the viewpoint of the heat resistance of the ion exchange resin particles.

When a pore-forming agent is employed, it is preferably used in an amount of from 5 to 40 wt % relative to the weight of the binder polymer. The type of the pore-forming agent is not particularly limited, and any pore-forming agent may be employed so long as it can be extracted subsequently with a solvent. A polymer powder of e.g. polyvinyl alcohol or polyester is preferred.

When a binder polymer solution is employed, its concentration is not particularly limited, and a solution having a concentration of from 5 to 50 wt %, is preferred. As the solvent, water or a usual organic solvent such as an alcohol, a ketone or an ester, may be employed. As a method for coating the binder polymer solution on the surface of the ion exchange resin particles, followed by evaporating the solvent for curing, the ion exchange resin particles may be placed on a mesh or a porous body as a support, and then the binder polymer solution is coated thereon, followed by drying, or the ion exchange resin particles may be dipped in the binder polymer solution, then dried and subjected to heat pressing. To produce a porous ion exchanger having the above-mentioned layered structure or matrix structure, a method may be employed wherein the cation exchange resin particles and anion exchange resin particles are separately solidified by binder polymers to obtain plate-shaped products, and their fragments may be alternately arranged, or various shapes may be punched out from the plate-shaped product to form holes, and the plate-shaped product of the other ion exchange resin is formed into the same shapes as the holes and embedded in the holes.

The porous ion exchanger of the present invention can be used for various apparatus for ion exchange as disposed in the flow pathway of a liquid. It is particularly useful for a method for continuously producing deionized water, as packed in a demineralizing compartment of an electrodialyzer having a cation exchange membrane and an anion exchange membrane alternately arranged.

Specifically, the following method is preferred as a method for producing deionized water. Namely, between an anode compartment provided with an anode and a cathode compartment provided with a cathode, a plurality of cation exchange membranes and anion exchange membranes are alternately arranged to form demineralizing compartments each defined by an anion exchange membrane on the anode side and by a cation exchange membrane on the cathode side, and concentrating compartments each defined by a cation exchange membrane on the anode side and by an anion exchange membrane on the cathode side, alternately in from 2 to 30 units in series. Demineralization can be carried out by conducting an electric current while supplying water to be treated to the demineralizing compartments and supplying water to discharge concentrated salts to the concentrating compartments. In each unit cell, it is preferred to apply a voltage of about 4 V so that dissociation of water takes place in the demineralizing compartment.

When the porous ion exchanger of the present invention is disposed in the above demineralizing compartment, production of deionized water can be carried out by a so-called self-regenerating type electrodialytic method. By molding the porous ion exchanger to fit the size of the demineralizing compartment, an apparatus having the ion exchanger fit in the demineralizing compartment can readily be assembled. In the case of a usual electrodialyzer, the porous ion exchanger to be mounted will be a plate-form. In the case of an electrodialyzer, the direction of the electric current will be perpendicular to the membrane surface i.e. in the thickness direction of the plate-form ion exchanger, and the flow of water will be perpendicular thereto.

The thickness of the porous ion exchanger corresponds to the distance between the membranes in the demineralizing compartment and is preferably from 1 to 30 mm. If the thickness is less than 1 mm, water in the demineralizing compartment tends to hardly flow, whereby the amount of water treated tends to decrease. If the thickness exceeds 30 mm, the electrical resistance of the apparatus tends to be too high. The thickness of the porous ion exchanger is more preferable from 3 to 12 mm.

The ion exchange resin particles may sometimes swell when immersed in water. Accordingly, it is necessary to mold the porous ion exchanger taking into such swelling degree into consideration, when it is assembled in an electrodialyzer. On the other hand, such swelling may be utilized to closely fit the porous ion exchanger to the flow pathway, whereby an unnecessary side flow can be prevented. Otherwise, the porous ion exchanger may be closely bonded in the flow pathway by means of the same material as the binder polymer.

The porous ion exchanger of the present invention may be used in such a manner that it is disposed in the flow pathway, and no electric current is applied during the ion exchange, and an electric current is applied to desorb the adsorbed ions, for regeneration. At the time of regeneration, the porous ion exchanger is disposed between an anode and a cathode, and a diaphragm is disposed between the anode and the porous ion exchanger and between the porous ion exchanger and the cathode, whereupon an electric current is conducted. The diaphragm is not necessarily an ion exchange membrane. However, for efficient regeneration, it is preferred to dispose an anion exchange membrane on the anode side of the porous ion exchanger and a cation exchange membrane on the cathode side.

BEST MODE FOR CARRYING OUT THE INVENTION

Now, the present invention will be described in further detail with reference to Examples. However, it should be understood that the present invention is by no means restricted by such specific Examples.

EXAMPLE 1

A sulfonic acid type cation exchange resin having a particle size of from 400 to 550 μm and an ion exchange capacity of 4.2 meq/g·dry resin (Amberlite 201CT, tradename, manufactured by Rohm and Haas) and a quaternary ammonium salt type anion exchange resin having a particle size of from 400 to 530 μm and an ion exchange capacity of 3.7 meq/g ·dry resin (Amberlite IRA400, tradename, manufactured by Rohm and Haas) were dried and then mixed in a ratio of cation exchange resin/anion exchange resin=50/50 (volume ratio in a dried state) to obtain a mixture having an ion exchange capacity ratio of 60/40.

To this mixture, 3 wt % of pelletized linear low density polyethylene (Affinity SM-1300, tradename, manufactured by Dow Chemical) was mixed and kneaded at a temperature of from 120° to 130° C. The obtained kneaded product was thermally formed by flat plate press at 130° C. and cut into a rectangular parallelopiped of 0.8 cm×13 cm×40 cm to obtain a porous ion exchanger. Between side surfaces of 0.8 cm×13 cm of this porous ion exchanger, the water permeability was 150 kg·cm$^{-1}$·hr$^{-1}$ under a pressure of 0.35 kg/cm$^2$, and the porosity of pores open to the exterior was 23 vol %. This porous ion exchanger was put into a cell defined by a pair of anion and cation exchange resin membranes, and water having an electroconductivity of 10 μS/cm was filled, whereupon an electric current was conducted. At a current density of 0.005 A/cm$^2$, the resistivity was 390 Ω·cm, which was lower than 680 Ω·cm measured in the same manner with respect to the ion exchange resins mixed in the same blend ratio and filled in the same cell.

This porous ion exchanger was incorporated into a demineralizing compartment of an electrodialyzer, and a water treatment test was carried out. The electrodialyzer was the one comprising a cation exchange membrane (Selemion CMT, tradename, manufactured by Asahi Glass Company Ltd.) and an anion exchange membrane (Selemion AMP, tradename, manufactured by Asahi Glass Company Ltd.) and having an effective surface area of 500 cm$^2$×5 pairs. Using water having an electroconductivity of 5 μS/cm as feed water, demineralization was carried out by applying a voltage of 4 V per unit cell, whereby treated water having an electroconductivity of 0.07 μS/cm was obtained constantly.

EXAMPLE 2

The same cation and anion exchange resins as used in Example 1 were dried and then mixed in a ratio of cation exchange resin/anion exchange resin=50/50 (volume ratio in a dried state) to obtain a mixture having an ion exchange capacity ratio of 60/40. This ion exchange resin mixture was placed on a 100 mesh polyester cloth, and a 50% nitrile rubber toluene solution was coated as a binder polymer solution thereon, followed by drying at 60° C. for 2 hours. The dried product was cut into a rectangular parallelopiped of 0.8 cm×13 cm×40 cm to obtain a porous ion exchanger.

The weight ratio of the binder polymer to the ion exchange resin used was 5/95, as determined from the weight increase.

The water permeability of the obtained porous ion exchanger was 130 kg·cm$^{-1}$·hr$^{-1}$ under a pressure of 0.35 kg/cm$^2$, and the porosity of pores open to the exterior was 25 vol %. Further, the resistivity measured in the same manner as in Example 1 was 620 Ω·cm, which was lower than 680 Ω·cm measured in the same manner with respect to the ion exchange resins mixed in the same blend ratio and put in the same cell.

This porous ion exchanger was incorporated into a demineralizing compartment of an electrodialyzer, and a water treatment test was carried out. The electrodialyzer was the one comprising a cation exchange membrane (Selemion CMT, tradename, manufactured by Asahi Glass Company Ltd.) and an anion exchange membrane (Selemion AMP, tradename, manufactured by Asahi Glass Company Ltd.) and having an effective surface area of 500 cm$^2$×5 pairs. Using water having an electroconductivity of 5 μS/cm as feed water, demineralization was carried out by applying a voltage of 4 V per unit cell, whereby treated water having an electroconductivity of 0.09 μS/cm was obtained constantly.

EXAMPLE 3

The same cation and anion exchange resins as used in Example 1 were dried and then mixed in a ratio of cation exchange resin/anion exchange resin=35/65 (volume ratio in a dried state) to obtain a mixture having an ion exchange capacity ratio of 45/55. This mixture was placed on a 100 mesh polyester cloth, and a 5% acrylic acid aqueous solution containing 0.2% of a block isocyanate (Prominate XC, tradename, manufactured by Takeda Chemical Industries, Ltd.) was coated as a binder polymer solution thereon, followed by drying at 50° C. for 30 minutes. This coating and drying operation was repeated three times, and finally thermal crosslinking treatment was carried out at 150° C. for 10 minutes. The obtained product was cut into a rectangular parallelopiped of 0.3 cm×13 cm×40 cm to obtain a porous ion exchanger. The weight ratio of the binder polymer to the ion exchange resin used was 15/85, as determined from the weight increase.

The water permeability of this porous ion exchanger was 180 kg·cm$^{-1}$·hr$^{-1}$ under a pressure of 0.35 kg/cm$^2$, and the porosity of continuous pores was 45 vol %. Further, the resistivity measured in the same manner as in Example 1 was 650 Ω·cm, which was lower than 680 Ω·cm measured in the same manner with respect to the ion exchange resins mixed in the same blend ratio and put in the same cell.

This porous ion exchanger was incorporated into a demineralizing compartment of an electrodialyzer, and a water treatment test was carried out. The electrodialyzer was the one comprising a cation exchange membrane (Selemion CMT, tradename, manufactured by Asahi Glass Company Ltd.) and an anion exchange membrane (Selemion AMP, tradename, manufactured by Asahi Glass Company Ltd.) and having an effective surface area of 500 cm$^2$×5 pairs. Using water having an electroconductivity of 5 μS/cm as feed water, demineralization was carried out by applying a voltage of 4 V per unit cell, whereby treated water having an electroconductivity of 0.12 μS/cm w as obtained constantly.

EXAMPLE 4

Using azobisisobutyronitrile as an initiator, 0.2 mol of tetrafluroethylene and 0.045 mol of $CF_2=CFOCF_2CF(CF_2)O(CF_2)_2SO_2F$ were copolymerized at a polymerization temperature of 70° C. for a polymerization time of 5 hours to obtain a copolymer having an ion exchange capacity of 1.1 meq/g. This copolymer was hydrolyzed in a 20% KOH aqueous solution at 90° C. over a period of 16 hours, then immersed in 1N hydrochloric acid at room temperature for 16 hours and converted to an acid type, and then dissolved in ethanol to obtain a perfluorosulfonic acid polymer solution having a concentration of 8%.

A mixture of the ion exchange resin particles obtained in the same manner as in Example 1 was placed on a 100 mesh polyester cloth, and the above 8% perfluorosulfonic acid polymer solution was coated as a binder polymer solution thereon, followed by drying at 50° C. for 30 minutes. This coating and drying operation was repeated three times. The coated product was cut into a rectangular parallelopiped of 0.3 cm×13 cm×40 cm to obtain a porous ion exchanger. The weight ratio of the binder polymer to the ion exchange resin used was 20/80, as determined from the weight increase.

The water permeability of the obtained porous sheet-form product was 160 kg·cm$^{-1}$·hr$^{-1}$ under a pressure of 0.35 kg/cm$^2$, and the porosity of continuous pores was 45 vol %. Further, the resistivity in water of 10 μS/cm was measured by putting it in a cell, whereby at a current density of 0.005 A/cm$^2$, the resistivity was 580 Ω·cm, which was lower than 680 Ω·cm measured in the same manner with respect to the ion exchange resins mixed in the same blend ratio and put in the same cell.

This porous ion exchanger was incorporated into a demineralizing compartment, and a water treatment test was carried out in the same manner as in Example 1. Using water having an electroconductivity of 5 μS/cm as feed water, demineralization was carried out by applying a voltage of 4 V per unit cell, whereby treated water having an electroconductivity of 0.07 μS/cm was obtained constantly. This performance was stable for one month.

The porous ion exchanger of the present invention has high mechanical strength as an ion exchanger and is excellent also in the ion exchange performance, whereby treated water having a stabilized purity can be obtained. The ion exchanger obtained by this method is in a sheet form, and it is easy to handle and requires no complex process step for its production, whereby a product having a stabilized performance can easily be obtained.

According to the method for producing deionized water of the present invention, deionized water of a high purity can be continuously produced constantly for a long period of time. Further, it has a feature that the porous ion exchanger is used, so that an electrodialyzer can readily be assembled.

We claim:

1. A porous ion exchanger which has a porous structure having ion exchange resin particles bound by a binder polymer, and which has a water permeability of at least 30 kg·cm$^{-1}$·hr$^{-1}$ under a pressure of 0.35 kg/cm$^2$.

2. A porous ion exchanger, comprising:
a porous structure comprising
ion exchange resin particles; and
a binder polymer; wherein
said binder polymer binds together said resin particles; and wherein the weight ratio of the binder polymer to the porous ion exchanger is 0.5 to 5%.

3. The porous ion exchanger according to claim 2, wherein the porosity of pores open to the exterior is from 5 to 50 vol %.

4. The porous ion exchanger according to claim 2, wherein the ion exchange resin particles are cation exchange resin particles, anion exchange resin particles, or a mixture of cation exchange resin particles and anion exchange resin particles.

5. The porous ion exchanger according to claims 2, wherein the resistivity when the porous ion exchanger is disposed in a demineralizing compartment of an electrodialyzer, is at most twice the resistivity when the ion exchange resin particles contained in the ion exchanger are by themselves packed in the same compartment.

6. The porous ion exchanger according to claims 2, wherein the binder polymer is a polymer containing ion exchange groups or groups which can be converted to ion exchange groups.

7. The porous ion exchanger according to claims 2, wherein the binder polymer is a thermoplastic polymer or a polymer soluble in a solvent.

8. A method for producing a porous ion exchanger as defined in claim 2, which comprises mixing ion exchange resin particles with a binder polymer, followed by thermoforming.

9. A method for producing a porous ion exchanger according to claim 2, which comprises mixing ion exchange resin particles with a binder polymer solution, followed by removing the solvent.

10. A method for producing deionized water, which comprises conducting an electric current while supplying water to be treated to a demineralizing compartment of a deionized water producing apparatus having an ion exchanger accommodated in the demineralizing compartment of an electrodialyzer having a cation exchange membrane and an anion exchange membrane alternately arranged between a cathode and an anode, wherein a porous ion exchanger as defined in claim 2 is used as the ion exchanger.

11. A method for regenerating an ion exchanger, which comprises disposing a porous ion exchanger as defined in claim 2 between a cathode and an anode and disposing a diaphragm between the cathode and the ion exchanger and between the ion exchanger and the anode, and conducting an electric current to desorb ions adsorbed on the ion exchanger.

12. An electrodialyzer which comprises a cation exchange membrane and an anion exchange membrane, and a porous ion exchanger as defined in claim 2 which is packed in a demineralization compartment defined by the cation exchange membrane and the anion exchange membrane.

13. The electrodialyzer according to claim 12, which comprises an anode compartment provided with an anode and a cathode compartment provided with a cathode, and a plurality of cation exchange membranes and anion exchange membranes which are alternately arranged between the anode compartment the cathode compartment to form demineralizing compartments each defined by an anion exchange membrane on the anode side and by a cation exchange membrane on the cathode side, and concentrating compartments each defined by a cation exchange membrane on the anode side and by an anion exchange membrane on the cathode side.

* * * * *